Dec. 30, 1969  W. C. ROGERS  3,487,412
TRAILING ANTENNA FOR AIRCRAFT
Filed Sept. 15, 1966  3 Sheets-Sheet 1

INVENTOR
WILLIAM C. ROGERS

BY Burns, Doane, Benedict,
Swecker & Mathis
ATTORNEYS

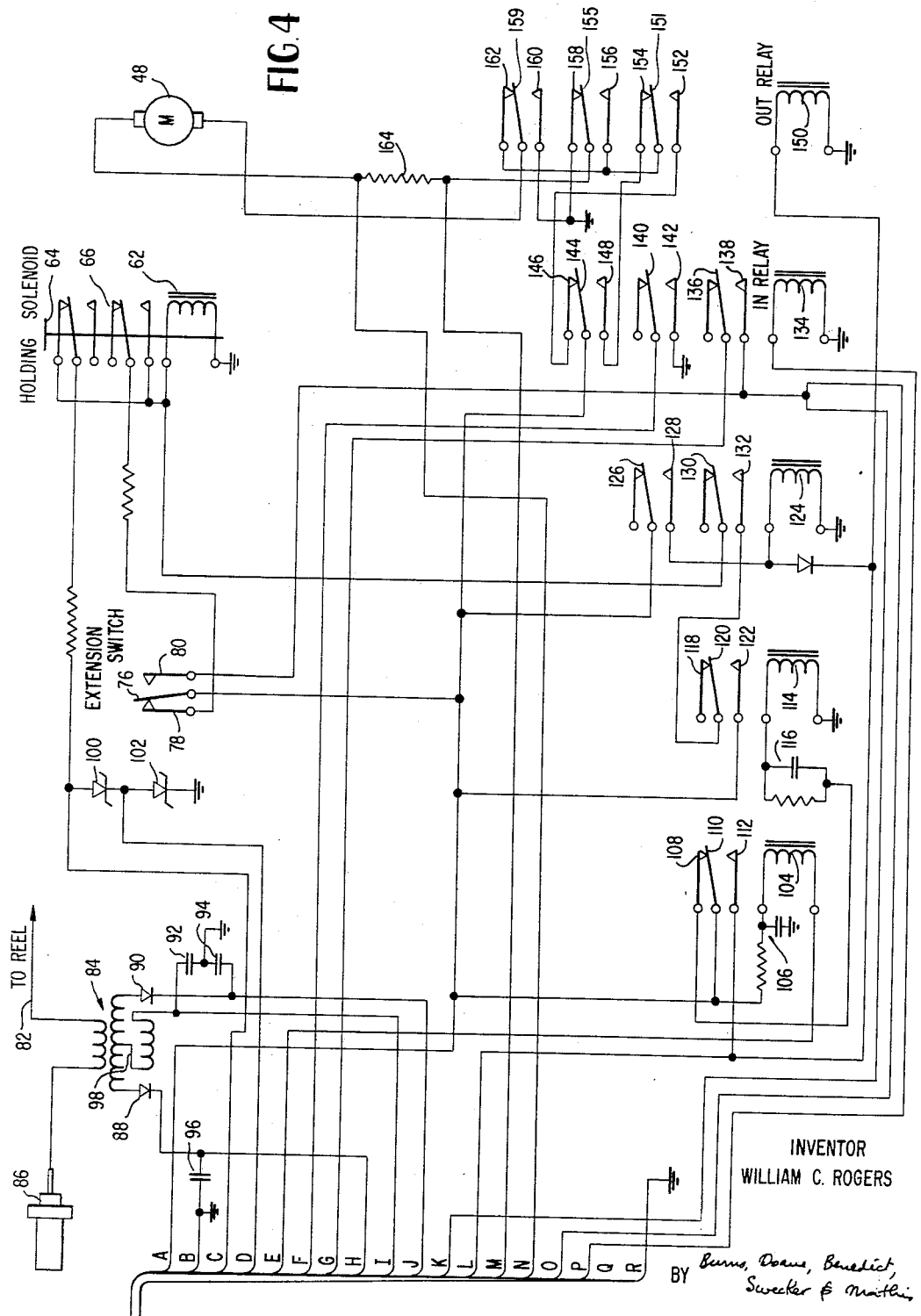

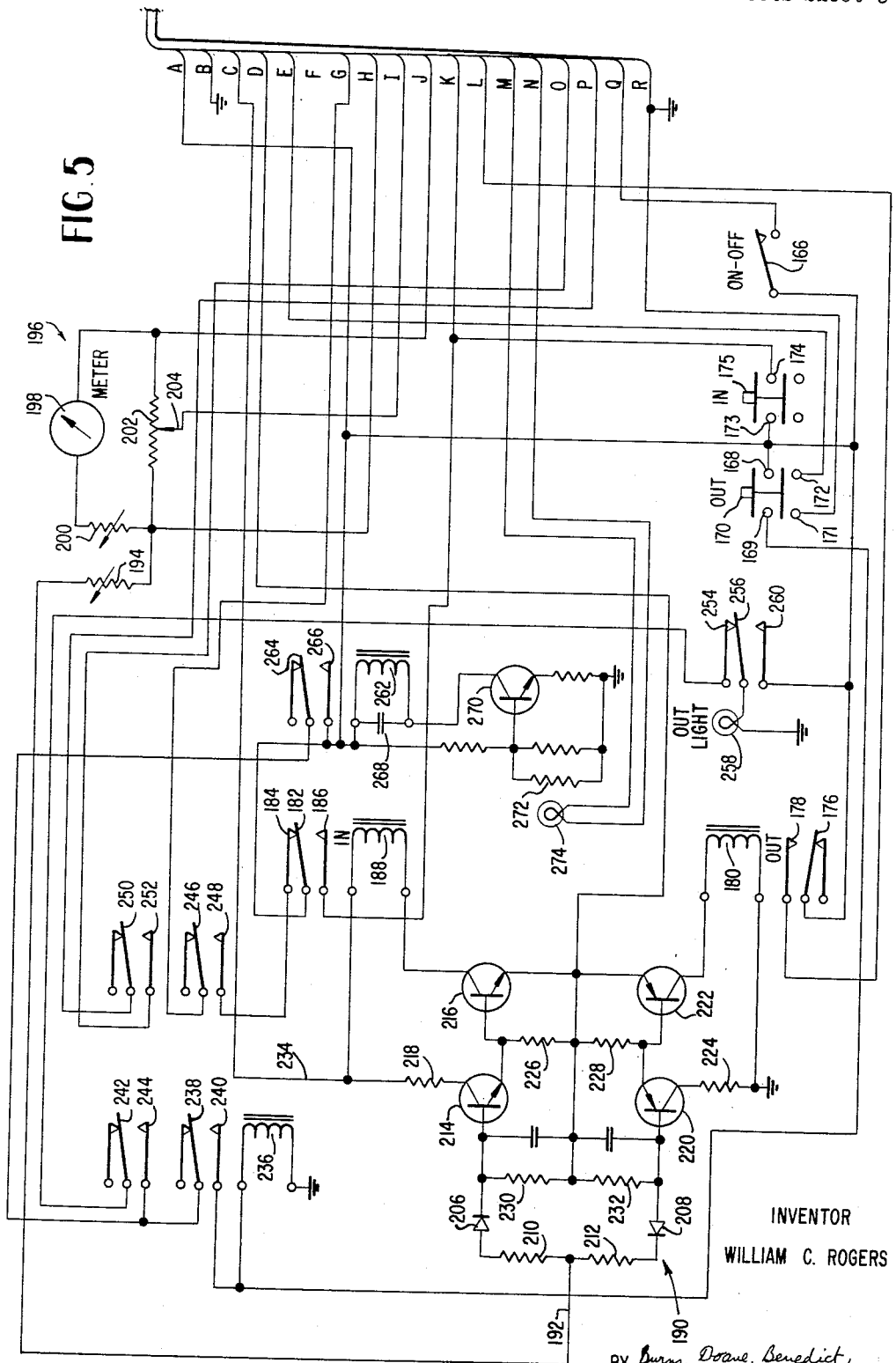

United States Patent Office 3,487,412
Patented Dec. 30, 1969

3,487,412
TRAILING ANTENNA FOR AIRCRAFT
William C. Rogers, 5365 NW. 36th St.,
Miami Springs, Fla. 33166
Filed Sept. 15, 1966, Ser. No. 579,547
Int. Cl. H01q 1/30
U.S. Cl. 343—707                           11 Claims

ABSTRACT OF THE DISCLOSURE

A trailing antenna system for an aircraft providing for selective extension and retraction of a wire antenna. Forceable exterior of the antenna is provided for until such time as an end portion of the antenna extends into the air stream created by motion of the aircraft. The antenna is then pulled to its fully extended length by action of the air stream.

---

This invention relates to a trailing antenna for aircraft and more particularly to a trailing antenna which may be automatically extended outwardly from or retracted into the aircraft.

Trailing antennas which extend outwardly from an airborne aircraft for several hundred feet have been found to provide excellent reception and transmission characteristics for transceivers located aboard the aircraft. Because of their extreme length, such trailing antennas are generally extended outwardly from the aircraft only after the aircraft is airborne and are generally retracted into the aircraft before the aircraft lands. Therefore, in order to begin operation of the aircraft transceiver as soon as possible after the aircraft becomes airborne, it is important that the trailing antenna be quickly extended to its proper length.

Depending upon the operating frequency of the aircraft transceiver, a certain length of the extended antenna exists which will make the antenna substantially resonant at the transceiver operating frequency in order to provide optimum transceiver operating performance. This length may exist at almost any point between the extreme extended and retracted lengths of the antenna, and thus it is important that the trailing antenna be quickly and accurately adjusted to the optimum length after the initial full extension. In such trailing antenna systems, it is also very important that the trailing antenna be automatically retracted or extended to a different optimum extended length when the transceiver frequency is changed. Additionally, when the aircraft begins to land, it is important that a trailing antenna system be capable of fully retracting the trailing antenna into the aircraft without exerting excessive strain on either the antenna or the retraction apparatus.

Accordingly, it is a general object of the present invention to provide a transceiver trailing antenna which may be automatically quickly extended outwardly from an aircraft to its fully extended length.

It is a more specific object of the present invention to provide a trailing antenna system which utilizes the force exerted on the trailing antenna by the air stream created by the motion of the aircraft to quickly fully extend the trailing antenna.

Another object of the present invention is the provision of a transceiver trailing antenna system which senses the full extension of the antenna outwardly from the aircraft in order to begin automatic retraction of the antenna to a desired optimum resonant length with respect to the particular transceiver operating frequency.

Yet another object of the present invention is the provision of a transceiver trailing antenna system wherein the trailing antenna may be automatically retracted or extended to a different optimum resonant length upon change of the operating frequency of the transceiver.

A further object of the present invention is a provision of a transceiver trailing antenna system wherein the trailing antenna may be automatically completely retracted into the aircraft without damage to the antenna or to the retracting mechanism.

In achieving these and other objects that will be apparent hereinafter, the instant invention provides a method and an apparatus for fully extending a trailing antenna wire from an airborne aircraft wherein the antenna wire is forcibly extended outwardly from the aircraft until an end portion of the antenna wire extends into the air stream created by the motion of the aircraft. The forcible extension of the antenna wire is then discontinued and the antenna wire is allowed to be freely pulled to its fully extended length by the action of the air stream upon the end portion of the antenna wire.

Additionally, the present invention provides apparatus for sensing the full extension of the antenna wire and automatically retracting a portion of the antenna wire into the aircraft until the extended antenna wire is in substantial resonance with an aircraft transceiver at a particular operating frequency. Apparatus is also provided by the present invention for fully retracting the antenna wire into the aircraft and for sensing the full retraction of the antenna wire in order to prevent damage to the antenna wire or to the retraction apparatus.

The invention has many advantages which may be best understood by reference to the following detailed description illustrated in the accompanying drawings, in which:

FIGURE 4 is a schematic diagram of the reel box circuitry of the present invention; and FIGURE 5 is a schematic diagram of the circuitry of the control box of the present invention.

Figure 1:
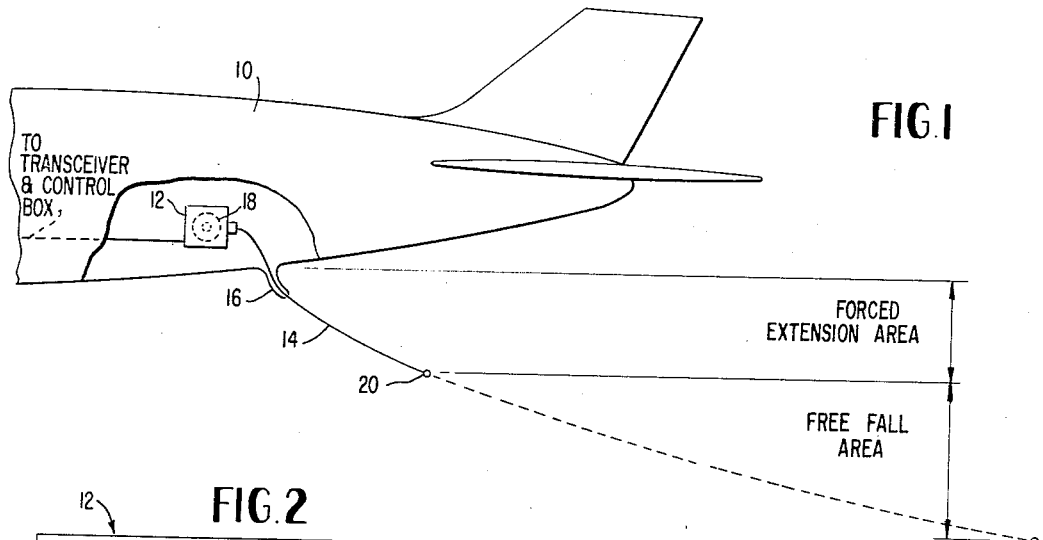
FIGURE 1 is a view partially in cross-section of an airborne aircraft carrying the present trailing antenna system and illustrating the areas of forced extension and free fall of the antenna wire.

FIGURE 1 illustrates an airborne aircraft 10 including a reel box 12 constructed in accordance with the present invention. A portion of a trailing antenna wire 14 is shown extended outwardly from the reel box 12 through a wire feed through member 16 located on the underside of the aircraft. The reel box 12 contains a rotatable reel 18 which may be selectively rotated to either extend or retract the antenna wire 14 from the aircraft. The direction of rotation of reel 18 is controlled by a control box, to be later described, which may be conveniently remotely located from the reel box along with a conventional transceiver. The extended length of the antenna wire 14 may be varied in accordance with the present invention in order to provide for maximum efficiency of the transceiver at a particular frequency.

During take-off of the aircraft 10, the antenna wire 14 is completely retracted and is wound about reel 18. When the aircraft becomes airborne, the reel 18 may be actuated by suitable circuitry in the control box to forcibly extend the antenna wire 14 outwardly from the aircraft. A turbulent air stream is created by the motion of the aircraft and fans outwardly from the body of the aircraft, sometimes leaving a relatively motionless air space between the body of the aircraft and the air stream. The boundaries of this relatively motionless air space depend upon the size and speed of the airplane, among other things, but may extend outwardly from the body of the aircraft for several feet. Because of this relatively motionless air space, the antenna wire 14 must be forcibly extended outwardly from the aircraft 10 as shown in FIGURE 1 until an end portion 20 of the antenna wire, which may be a streamlined weight, extends into the air stream created by the motion of the aircraft. The air stream creates a substantial drag upon the end portion 20.

The reel 18 is motor driven, and necessarily requires gearing which limits the speed at which the antenna wire 14 may be extended outwardly from the aircraft 10. In order to quickly extend the antenna wire 14, the present invention contemplates discontinuing the forcible extension of the antenna wire 14 when the end portion 20 reaches the air stream and then allowing the antenna wire to be quickly pulled to the fully extended length of several hundred feet, as shown in FIGURE 1, by the action of the air stream upon the end portion 20. This is accomplished by disconnecting the reel 18 from the driving motor to allow the antenna wire 14 to quickly free fall to the fully extended position. By utilization of the present invention, not only is it possible to quickly extend the antenna wire so that the aircraft transceiver may be used shortly after the aircraft becomes airborne, but substantial wear upon the reel driving motor and associated gearing is minimized.

REEL BOX CONSTRUCTION

Figure 2:
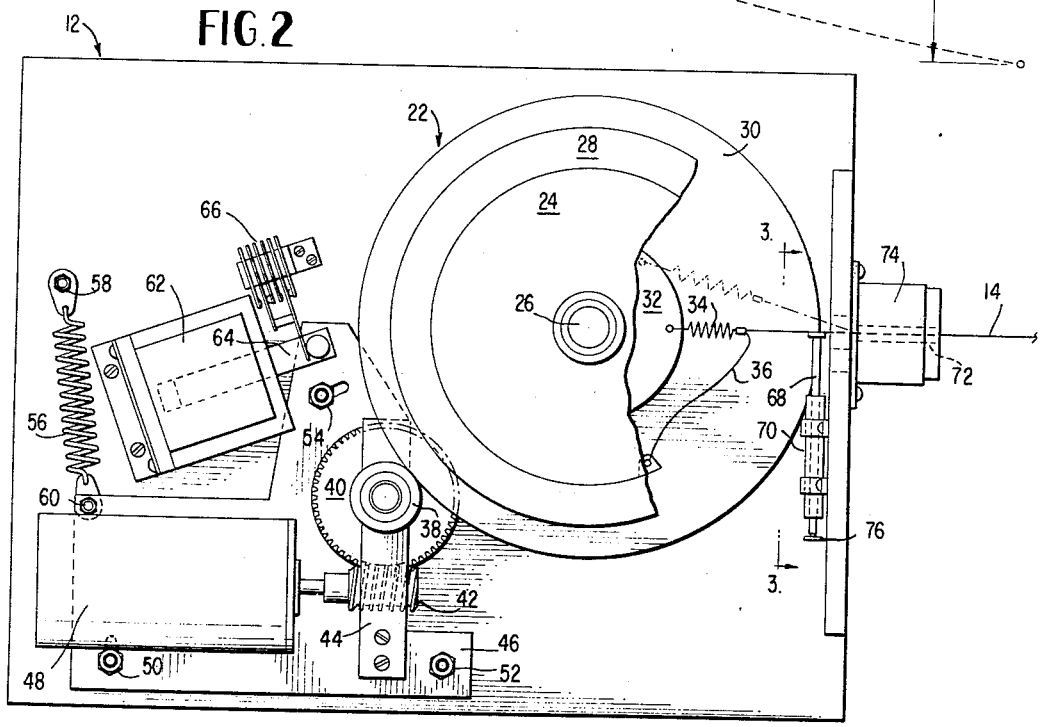
FIGURE 2 is a diagrammatic cross-sectional side view of the antenna reel box of the present invention.

FIGURE 2 illustrates in detail the construction of the reel box 12 according to the present invention. The reel box 12 includes a suitable chassis which encloses the rotatably mounted reel 22. The reel 22 comprises an electrically insulated center portion 24 which is mounted for rotation about the pivot 26. A circumferential portion of the reel is electrically conductive, and may be constructed from a glass board having a copper layer affixed thereto. An outer reel drive rim 30 is provided for being frictionally driven and may comprise for example a Bakelite disc. The antenna wire 14 is affixed to a reel hub 32 by means of a spring 34. A short wire 36 connects the antenna wire 14 to the conductive portion 28 of the reel 22.

Rotary motion is imparted to the reel 22 by a rubber drive wheel 38 which frictionally bears upon the outer reel drive rim 30. The drive wheel 38 is driven by gear 40 which in turn is rotated by a worm gear 42. The drive wheel 38 and gear 40 are rotatably supported by a bracket 44 which is permanently affixed to a shiftable plate 46. A driving motor 48 is permanently mounted to the plate 46 and provides rotary motion to the worm gear 42 in order to rotate the reel 22. The driving motor 48 may be a series DC motor capable of providing rotation in either of two opposite directions.

The plate 46 is mounted upon support members 50, 52 and 54, with slots being provided in plate 46 to allow the plate to be shifted with respect to the members 50 and 54. A spring 56 is connected by fastener 58 to the chassis of the reel box 12 and by the fastener member 60 to the plate 46 in order to normally hold the plate 46 in the position shown to tension the rubber drive wheel 38 into frictional contact with rim 30 of reel 22.

A solenoid 62 is fixedly mounted to the reel box chassis and includes a movable arm 64 connected to an extension of the plate 46. When the solenoid 62 is energized, the arm 64 is moved inwardly into the solenoid 62 in order to shift the position of plate 46. As the motor 48 and the drive wheel 38 are fixedly connected to plate 46, movement of the arm 64 moves the drive wheel 38 out of contact with reel 22. This releases the reel 22 and allows the antenna wire 14 to be quickly pulled to its extended position by the drag of the air stream. A set of relay contacts 66 are mechanically closed by movement of the relay arm 64 in order to hold the solenoid 62 energized in a manner to be subsequently described in greater detail.

An extension switch including a plunger member 68 slidably mounted within a housing 70 is positioned near the reel 22 in order to extend adjacently to the antenna wire opening 72 defined in the wire guide member 74.

Figure 3:
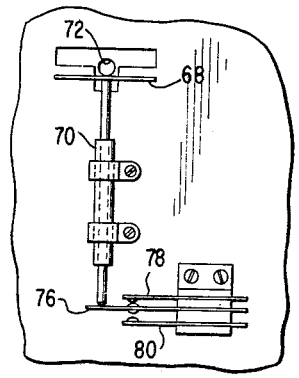
FIGURE 3 is a diagrammatic view of the reel box extension switch of the present invention taken along the sectional lines 3—3 of FIGURE 2.

The bottom end of the plunger member 68 bears against a movable switch contact 76. As best shown in FIGURE 3, the contact 76 normally is closed with contact 78 and open circuited from contact 80. When the antenna wire 14 is being extended or retracted by the reel 22, the plunger member 68 is not physically contacted by the antenna wire, as shown by the dotted line in FIGURE 2. However, when the antenna wire 14 is fully extended from the reel 22, as shown in FIGURE 2, the antenna wire depresses the plunger member 68, causing the contact 76 to be closed upon contact 80 to denote the full antenna wire extension.

REEL BOX OPERATION

The operation of the reel box 12 may be best understood with reference to FIGURES 2 and 3. When the antenna wire 14 is fully retracted and wound about reel 22, the motor 48 may be suitably energized to rotate the worm gear 42, which rotates the drive wheel 38 through gear 40 to forcibly extend the antenna wire from the aircraft 10. When the antenna wire 14 has been extended to a length wherein the end portion 20 extends into the air stream created by the motion of the aircraft, suitable control circuitry to be later described energizes solenoid 62 in order to move the arm 64 to shift the position of the plate 46. The movement of the plate 46 releases the reel 22 from frictional engagement with the drive wheel 38. The reel 22 is thus free to rotate and the antenna wire 14 may be quickly pulled from the reel 22 by the action of the air stream on the end portion 20. The solenoid 62 is maintained in an energized condition by the switch 66 until the antenna wire 14 is fully extended, as will be later described.

As previously described, when the antenna wire 14 is wound about the circumference of the reel hub 32, the antenna wire 14 does not physically touch the plunger 68, as shown by the dotted line extension of the antenna wire in FIGURE 2. However, when the antenna wire 14 reaches its fully extended position, the antenna wire 14 comes into physical contact with plunger 68 and moves it downwardly to close contacts 76 and 80. These contacts energize suitable circuitry, to be later described, in order to deenergize solenoid 62 and reengage the drive wheel 38 with reel 22. Motor 48 is then energized to rotate in a suitable direction to cause the reel 22 to retract a portion of the antenna wire 14.

REEL BOX ELECTRICAL CIRCUITRY

FIGURE 4 is a schematic diagram of the electrical circuitry located in the reel box 12, and includes the motor 48, the holding solenoid 62 and the solenoid arm 64, the holding contacts 66, and the extension switch contacts 76, 78 and 80, all previously shown in FIGURE 2. The circuitry shown in FIGURE 4 is connected to suitable sources of power and to other circuitry located in the remotely disposed control box by means of suitable cables, the terminal connections of which are lettered A through R.

A lead 82 is connected to the antenna wire 14 through a suitable sliding contact, not shown, with the conductive portion 28 of the reel 22, shown in FIGURE 2. As is well known, the magnitude of the energy appearing on the antenna wire 14 varies in dependency upon the extended length of the antenna wire and the frequency of the energy being transmitted or received by the antenna wire. The primary side of a transformer 84 is connected between the lead 82 and a jack 86. The jack 86 is adapted to be connected to suitable transceiver circuitry.

Diodes 88 and 90 are connected at opposite ends of the secondary of transformer 84, with capacitors 92, 94 and 96 being provided to shunt high frequency energy from the reel box circuitry. The cathode of diode 88 is connected to cable terminal H, with the cathode of the diode 90 connected to cable terminal J. The transformer 84 is center tapped by a lead 98 which is connected to the cable terminal I. A pair of Zener diodes 100 and 102 are connected across the cable terminals C and D, with the anode of diode 100 being connected to one of the movable contacts 66.

Five relays are provided in the circuit to perform various control functions to be later described. Relay coil 104 is connected through a R-C delay network 106 to the cable terminals A and E. Coil 104 controls the operation of the normally closed contacts 108 and 110, in addition to the normally open contact 112. Contact 108 is connected to a relay coil 114 through a R-C differentiating network 116. Relay coil 114 controls the operating position of contacts 118, 120 and 122. Contact 122 is directly connected to a source of bias voltage through cable terminal A. The contact 112 of relay coil 104 is connected to a relay coil 124, which controls the operation of the normally open circuited movable contact 126 and contact 128, in addition to the normally open circuited contacts 130 and 132. Contacts 120 and 132 are directly connected, with contact 130 being connected to the relay coil 62. Movable contact 126 is directly connected to the cable terminal A.

The IN relay coil 134 is connected to the cable terminal P and controls the operative position of contact pairs 136 and 138, 140 and 142. The relay coil 134 also controls the operation of the movable contact 144 between contacts 146 and 148. Contact 138 is connected to cable terminals K and O, in addition to contact 80 of the extension switch. Movable contact 136 is connected to cable terminal G. Contact 142 is connected to ground and contact 140 is connected to cable terminal F. Movable contact 144 is directly connected to a source of bias voltage through terminal A.

OUT relay coil 150 controls the operation of the motor 48 by controlling the position of contact 151 between contacts 152 and 154, the position of contact 155 between contacts 156 and 158, and the position of movable contact 159 between contacts 160 and 162. Contacts 146 and 148 of the IN relay are connected to contacts 152 and 154 of the OUT relay. Contacts 151, 156 and 162 are interconnected. A resistor 164 is connected in series between contact 155 and one terminal of the motor 48. Contacts 158 and 160 are grounded, while contact 159 is connected to the second terminal of motor 48. Resistor 164 is also connected across cable terminals M and N.

CONTROL BOX ELECTRICAL CIRCUITRY

FIGURE 5 illustrates in schematic detail the circuitry of a control box which may be remotely disposed from the reel box 12 and suitably connected to the reel box 12 by cables, the terminals of which are designated as A through R and which correspond to similar terminals shown in FIGURE 4. The control box may comprise a suitable chassis, upon which an ON-OFF switch 166 may be mounted. Switch 166 is connected across a suitable source of bias voltage, not shown, through cable terminals A and Q. Contact 168 of an OUT switch 170 is connected to the ON-OFF switch 166. Contacts 171 and 172 of OUT button switch 170 are respectively connected to cable terminals R and E. Contact 168 is directly connected to an IN switch contact 173, while contact 174 is connected to cable terminal K. The IN button switch 175 is normally open-circuited from contacts 173 and 174, but may be depressed to close the contacts.

The ON-OFF switch 166 is also connected to a movable contact 176 which is normally open-circuited but which may be closed upon contact 178 upon the energization of OUT relay coil 180. Similarly, the movable contact 182 is directly connected to one side of the ON-OFF switch 166. The movable contact 182 normally connects contact 184, but may be switched into connection with contact 186 upon energization of the IN relay coil 188. The relay coils 180 and 188 are selectively energized according to the conductive state of a differential circuit 190. A lead 192 is connected to the input of the differential circuit 190 and is connected through a variable resistor 194 to the meter circuit 196.

The meter circuit 196 comprises a conventional meter 198 which is connected in series with an adjusting resistor 200 and which may be suitably mounted on the control box chassis. A balancing potentiometer 202 is connected across the meter and to the variable resistor 194. The meter circuitry is connected across cable terminals H and J in order to be directly connected across the secondary of the transformer 84 (FIGURE 4) to receive an indication of the magnitude of the energy upon the antenna wire 14. The movable arm 204 of the potentiometer 202 is connected through the cable terminal I to the center tap lead 98 of the transformer 84. A signal having a magnitude proportional to the energy appearing on the trailing antenna 14 is thus presented to the meter circuitry 196 and to the differential circuit 190 through the input lead 192.

The differential circuit 190 comprises semi-conductor diodes 206 and 208 having terminals of opposite polarity connected together through resistors 210 and 212. The cathode of the diode 206 is connected to the base of a NPN transistor 214 which is series connected by its emitter to the base of a similar NPN transistor 216. The relay coil 188 is connected in series with a resistor 218 across the collectors of transistors 214 and 216. The anode of the semiconductor diode 208 is connected to the base of a PNP transistor 220 which is series connected to the base of a similar PNP transistor 222. Relay coil 180 is connected in series with a resistor 224 across the collectors of transistors of 220 and 222.

The emitters of the two pairs of series connected transistors are interconnected in a differential configuration through direct connection and through resistors 226 and 228. Additionally, resistor-capacitor circuits 230 and 232 connect the bases of transistors 214 and 220 to the cable terminal D in order to provide bias to the circuit. One terminal of the IN relay coil 188 is connected to cable terminal C through a lead 234.

A relay coil 236 controls the operative position of four movable contacts, including contact 238 which is normally held open from contact 240. Relay coil 236 and contact 240 are both directly connected to terminal 169 of the OUT switch 170. A movable contact 242 is normally held open from contact 244 which is directly connected to the movable contact 238. A movable contact 246 is normally held open from a contact 248 which is directly connected to the source of bias voltage from cable terminal A through the normally closed contacts 182 and 184. A normally open contact 246 is connected to terminal G which is in turn connected to contact 136 of the IN relay located in the reel box 12. A normally open contact 250 is directly connected to cable terminal P, while contact 252 is connected to cable terminal O.

Movable contact 242 is connected to a terminal 254 which is normally connected to the movable contact 256 of the OUT lamp 258. Contact 260 of the OUT lamp 258 is directly connected to the source of bias voltage through cable terminal A. A relay coil 262 controls the operation of a movable contact 264, which is normally held open from the contact 266. The movable contact 264 is directly connected to contacts 244 and 238, while the contact 266 is directly connected along with relay coil 262 to the source of bias voltage through terminal A.

The capacitor 268 is connected across relay coil 262 and is also connected to the collector of a NPN transistor 270. The transistor is normally conductive due to suitable associated resistors and the direct connection to the source of bias voltage through terminal A. A light sensitive resistor 272 is connected across the base of the transistor 270 and ground in order to normally provide a relatively high impedance to the transistor 270. A light source 274, which may be an incandescent lamp, is connected across cable terminals M and N in order to provide light when a predetermined voltage appears across the resistor 164 connected in series with motor 48, as will be later described in greater detail.

OPERATION OF THE ELECTRICAL CIRCUITRY

The operation of the circuitry of the reel box 12 and of the control box may be best understood by reference to FIGURES 2, 4 and 5. To fully extend the antenna wire 14 when the aircraft 10 becomes airborne, the power switch 166 is first closed to provide suitable bias voltage to the associated circuitry. The OUT button 170 on the control box is then pressed, which causes the relay coil 236 (FIGURE 5) to be energized through contacts 168 and 169. Each of the normally open circuited movable contacts 238, 242, 246 and 250 are then closed with their associated contacts 240, 244, 248 and 252. The OUT indicator lamp 258 is thus energized through cable terminal A and through contacts 168, 169, 240, 238, 244, 242, 254, and 256.

Further, upon the momentary closing of the OUT button 170, the relay coil 104 shown in FIGURE 4 is energized by the source of bias voltage from cable terminal A through contacts 168 and 172, and cable terminal E. This energization of relay coil 104 causes the movable contact 110 to close upon contact 112 in order to supply bias voltage to the OUT relay coil 150. Energization of the OUT relay coil 150 causes the movable contact 151 to be closed upon contact 152, the movable contact 155 to be closed upon contact 156, and the movable contact 159 to be closed upon contact 160. The motor 48 then becomes energized by the biasing voltage supplied at terminal A through the IN relay contacts 144 and 146; the OUT relay contacts 152, 151, 156 and 155; resistor 164; and through the OUT relay contacts 159 and 160 to ground.

As illustrated in FIGURE 2, the shiftable plate 46 is normally pulled upwardly by the spring 56 and the solenoid 62 is normally deenergized. The energization of motor 48 by the OUT relay will thus cause the reel 22 to be rotated in a clockwise direction to extend the antenna wire 14 outwardly from the aircraft 10. In order that the antenna wire 14 only be extended outwardly from the aircraft 10 to a length where the end portion 20 (FIGURE 1) extends into the air stream caused by the motion of the aircraft 10, the relay coil 104 is provided with the resistor-capacitor delay circuit 106. The relay circuit 106 holds the relay coil 104 energized only for a predetermined time interval determined by the relative magnitudes of the resistor and the capacitor. The time interval is sufficient to allow the antenna wire 14 to be extended outwardly from the aircraft for a predetermined number of feet. When the predetermined time interval has elapsed, the relay coil 104 returns to its deenergized position, as the OUT button switch has returned to the normal opened position shown in FIGURE 5.

When the movable contact 110 again is closed with the contact 108 due to the deenergization of the relay coil 104, a pulse is provided by the differentiating circuit 116 to the relay coil 114. The resulting momentary energization of the relay coil 114 causes the normally open movable contact 120 to be moved against contact 122 in order to supply bias voltage from terminal A to contact 132 of the relay coil 124. The relay coil 124 becomes energized and closes contacts 126 and 128 in order to hold the coil 124 in an energized position with bias voltage from cable terminal A. The bias voltage from terminals 122 and 120 is fed through terminals 132 and 130 to energize the holding solenoid coil 62. The relay coil 124 is thus used as a safety interlock relay in order not to allow bias voltage to reach the holding solenoid unless the OUT relay 150 has been previously energized.

Upon energization of the holding solenoid coil 62, the movable arm 64 of the solenoid will be moved inwardly towards the solenoid coil 62 in order to release the driving motor 48 and its associated gears from the reel 22, as previously discussed with reference to FIGURE 2. The movement of the movable arm 64 causes the movable contacts of the switch 66, also shown in FIGURE 2, to be moved in order to hold the solenoid coil 62 in an energized condition through the application of bias voltage from terminal A through the normally closed extension switch contacts 76 and 78. The antenna wire 14 is thus allowed to be fully extended by the action of the air stream upon the end portion 20, as previously described.

When the antenna wire 14 is fully extended, the plunger 68 shown in FIGURE 2 will be momentarily moved downwardly in order to close contacts 76 and 80 of the extension switch shown in FIGURE 4. The solenoid 62 is thus deenergized and the movable arm 64 returns to its normal extended position in order to again engage the driving mechanism connected to the plate 46 to be reengaged with the reel 22.

When the contacts 76 and 80 of the extension switch are momentarily closed, the relay coil 134 is energized from bias voltage terminal A through contacts 76 and 80, cable terminal O, contacts 252 and 250 (FIGURE 5), and cable terminal P. The contacts 136 and 138 of the relay coil 134 are thus closed in order to provide a holding voltage to relay coil 134. Additionally, the movable contact 140 is closed on contact 142 by the energization of the relay coil 134 in order to activate the associated transceiver circuitry through cable terminal F for transmission or reception of high frequency signals.

The movable contact 144 is also closed upon the contact 148 upon energization of the relay coil 134 in order to cause the motor 48 to rotate in a counterclockwise direction in order to retract the antenna wire. The OUT relay coil 150 is of course deenergized when the relay coil 104 becomes deenergized. Thus, upon the energization of the relay coil 134, the motor 48 is energized by a voltage supplied by cable terminal A through contacts 144, 148, 154, 151, 162 and 159. One terminal of the motor 48 is connected to ground through resistor 164, contact 155, and contact 158.

As the aircraft transceiver is energized through the energization of the relay coil 134, a transmitted or received signal appears upon the antenna wire 14. This signal is fed from the transformer 84 to the input of the differential control circuitry 190 (FIGURE 5) through cable terminals H and J, variable resistor 194, and lead 192. As previously described, bias voltage is applied to the differential circuitry through cable terminals C and D. As is known, if the length of the antenna wire 14 is excessively long for the present resonant frequency, a positive voltage will be applied to the input of the differential circuitry 190. The transistors 214 and 216 will conduct due to the resulting voltage imbalance in the circuit, and the IN relay coil 188 will be energized.

The energization of the relay coil 188 will cause a movable contact 182 to close upon the contact 186, thus providing bias voltage from cable terminal A through contacts 182 and 186, cable terminals K and O, contacts 252 and 250, and cable terminal P to insure that relay coil 134 remains energized after the momentary actuation of the extension switch. As the antenna wire 14 is retracted into the aircraft, the extended antenna wire approaches the optimum length for the transceiver at a particular operating frequency. The signal applied on lead 192 to input of the differential circuitry 190 thus approaches a magnitude of zero. When the zero magnitude occurs, the differential circuitry 190 becomes balanced and the relay coil 188 is deenergized. The movable contact 182 closes on the contact 184 and the biasing voltage from cable terminal A is no longer supplied to energize the relay coil 134. The rotation of motor 48 is then stopped.

The motor 48 remains deenergized as long as desired in order to hold the antenna wire 14 extended to the proper length for providing optimum performance of the transceiver at a certain operating frequency. If the operating frequency of the transceiver is changed, the differential circuitry 190 will sense the change in polarity of the signal supplied by the transformer 84 in order to energize motor 48 to readjust the length of the antenna wire 14 according to the new transceiver frequency. If the signal supplied by the transformer 84 is negative, the transistors 220 and 222 will be conductive in order to energize the relay coil 180. The movable contact 176 will thus be closed upon the contact 178 in order to supply bias voltage from terminal A through terminal L to the OUT relay coil 150. Energization of the relay coil 150 will cause the motor 48 to rotate in a direction to extend the antenna wire 14 outwardly from the aircraft in a manner previously described. Similarly, if the voltage supplied by the transformer 84 becomes positive when the operating frequency of the transceiver is changed, the differential circuitry 190 will cause the length of the antenna wire 14 to be retracted into the aircraft until substantial resonance at the operating frequency exists.

The polarity of the signal supplied by the transformer 84 is visually registered by the meter 198 which is connected across the secondary of the transformer 84. The center tap lead 98 of the transformer 84 is connected through cable terminal I to the movable balance arm 204 of the potentiometer 202 in order to enable the meter to be balanced in the event of variances in the output of certain transmitters. Also in this regard, the variable resistors 194 and 200 enable the magnitude of the signal applied to the differential circuitry 190 to be adjusted. The IN switch 175 may be manually depressed in order to override the automatic adjustment of the length of the antenna wire 14. Upon depression of the IN button 175, bias voltage is applied directly through cable terminal K to the IN relay coil 134 in a manner previously described.

When it is desired to completely retract the antenna wire 14 into the aircraft 10, control circuitry is provided to sense the complete retraction of the wire on reel 22 in order to prevent damage to the antenna wire 14 or to the motor 48. A low resistance, high wattage, resistor 164 is thus placed in series with the motor 48. In normal operation of the motor 48, a very small voltage is developed across resistor 164 and no control function is provided. However, when the motor 48 develops excessive torque due to complete retraction of wire 14, a relatively high voltage appears across the resistor 164. This voltage is sufficient to energize the light source 274 through terminals M and N. The light provided by the source 274 causes the photosensitive resistor 272 to substantially decrease in resistance, thereby drawing a relatively large amount of current and causing the normally conductive transistor 270 to become cut off.

This substantially stops the flow of current through the normally energized relay coil 262 and causes contact 264 to be open-circuited from contact 266. Bias voltage is no longer applied to the relay coil 236 through holding contacts 238 and 240, thus causing the movable contacts 238, 242, 246 and 250 to be open-circuited. The opening of the movable contact 250 from the contact 252 cuts off the bias voltage supplied to the relay coil 134 (FIGURE 4), which in turn deenergizes the motor 48. Rotation of the reel 22 is thus stopped to prevent damage. Also because of the deenergization of the relay coil 236, voltage is no longer supplied to the OUT light 258 in order to denote that the wire is fully retracted.

It should be understood that provision could be made in connection with the end switch 175 to automatically retract the antenna wire 14 when the aircraft 10 begins to slow down for a landing. Additionally, certain of the previously described circuitry and mechanical features could be used to match the output of the high frequency transmitter with a fixed length trailing antenna by the adjustment of suitable tuning circuitry connected to the antenna. The antenna wire 14 can also function as a static discharge member from the aircraft frame with the utilization of suitably constructed wire.

The present invention thus provides a convenient method and apparatus for quickly extending a trailing antenna wire from an airborne aircraft, in addition to providing automatic adjustment of the length of the antenna wire in order to provide optimum performance for associated aircraft transceiver circuitry. The present invention also provides for automatically disconnecting the antenna retraction circuitry when the antenna is fully wound in. The novel transistorized circuitry and associated mechanical features provide a very light weight, compact system in addition to providing very accurate automatic control of the antenna wire.

While a preferred embodiment has been described, the invention should not be limited to the exact apparatus illustrated, as various modifications of the apparatus which do not depart from the essence of the invention will be obvious to those skilled in the art.

What is claimed is:

1. A method of extending a trailing antenna wire from an airborne aircraft comprising:
   forcibly extending said antenna wire outwardly from the aircraft for an interval of time until an end portion of said antenna wire extends into the air stream created by the motion of the aircraft,
   discontinuing forcible extension of said antenna wire at the end of said time interval by declutching said antenna wire from the source of force having provided the forcible extension thereof,
   and allowing said antenna wire to be freely pulled to its fully extended length by the action of the air stream upon the end portion of said antenna wire.

2. A transceiver trailing antenna system for an aircraft comprising:
   a flexible trailing antenna wire for being selectively extended outwardly from the aircraft into an air stream created by the motion of the aircraft,
   driving means, selectively connected to said antenna wire, for forcibly extending said antenna outwardly from the aircraft during a predetermined time interval to extend an end portion of said antenna wire into the air stream,
   and time delay means operatively associated with said driving means for disconnecting said driving means from said antenna wire in response to the expiration of said predetermined time interval in order to allow the action of the air stream upon the antenna wire end portion to fully extend said antenna wire outwardly from the aircraft.

3. A transceiver trailing antenna system for an aircraft comprising:
   a flexible trailing antenna wire for being selectively extended outwardly from the aircraft into an air stream created by the motion of the aircraft,
   reel means for receiving said antenna wire,
   driving means for rotating said reel means in a first direction to extend an end portion of said antenna wire into the air stream,
   and means for selectively releasing said reel means from said driving means in order to allow the action of the air stream upon the antenna wire end portion to fully extend said antenna wire outwardly from the aircraft, said means for releasing said reel means comprising,
      a power source,
      relay means having open and closed positions connected between said power source and said driving means, said driving means being energized by said power source through said relay means when in the closed position for rotating said reel means,
      delay means for holding said relay means in the closed position only for a predetermined time period, and solenoid means responsive to the open position of said relay means to release said reel means from said driving means for allowing said antenna to be fully extended.

4. The apparatus of claim 3 and further comprising:
a housing containing said reel means,
a support member moveably mounted on said housing, said driving means being rigidly mounted on said support member and adapted to be selectively moved into and out of engagement with said reel means,
said solenoid means having an arm operable to move said support member for selectively moving said driving means into and out of engagement with said reel means.

5. The apparatus of claim 2 and further comprising:
switch means activated only when said antenna wire is fully extended for causing said driving means to rotate said reel means in a second direction to retract said antenna wire,
transceiver means operatively connected to said antenna wire,
transformer means electrically connected to said antenna wire for monitoring the signal appearing on said antenna wire,
and differential circuitry responsive to the polarity of the signal monitored by said transformer means to stop rotation of said reel means when said antenna wire is in substantial resonance with said transceiver means.

6. The apparatus of claim 5 wherein said switch means comprises:
a slidable plunger mounted adjacent said reel means and said antenna wire, said antenna wire physically moving said slidable plunger only when said antenna wire is fully extended,
and electrical contact means mounted on said slidable plunger for being closed to cause said driving means to rotate said reel means.

7. The apparatus of claim 5 wherein said differential circuitry comprises:
first and second pairs of series connected transistors each having a base, emitter and collector, the emitters of said pairs of transistors being interconnected in a differential configuration,
first and second relay coils each being connected across the collectors of one of said pairs of series connected transistors,
first and second semiconductor diodes each having a terminal connected to a base of one of said pairs of series connected transistors and another terminal connected to said transformer means,
said first relay coil being energized when the voltage monitored by said transformer means is positive and said second relay coil being energized when the voltage monitored by said transformer means is negative, the direction of rotation of said reel means being dependent upon the relay coil energized.

8. The apparatus of claim 5 and further comprising:
a light source operable in dependency upon said driving means for providing light only when said antenna wire is completely retracted by said reel means,
and electrical circuit means responsive to the light provided by said light source to stop rotation of said reel means by said driving means.

9. A trailing antenna system for an aircraft comprising:
a trailing antenna wire for being selectively extended and retracted outwardly from the aircraft,
reel means for said antenna wire,
reversible driving means for rotating said reel means in a selected direction in order to extend or retract said antenna wire outwardly from the aircraft,
light source means electrically connected to said driving means for providing light only when said antenna wire is completely retracted by said reel means,
and electrical circuit means operable in dependency on light provided by said light source means to stop rotation of said reel means by said driving means.

10. The apparatus of claim 9 wherein said electrical circuit means comprises:
circuitry including a normally conductive transistor having an input and an output,
normally energized relay means connected across the input and output of said transistor, said relay means when de-energized being operable to stop rotation of said reel means,
light sensitive resistance means connected to the input of said transistor and normally providing a high impedance,
said resistance means providing a relatively low impedance in response to light provided by said light source in order to de-energize said relay means and stop rotation of said reel means.

11. A transceiver trailing antenna system for an aircraft comprising:
a flexible trailing antenna wire for being selectively extended outwardly from the aircraft into an air stream created by the motion of the aircraft,
reel means for receiving said antenna wire,
driving means, biased into driving engagement with said reel means, for rotating said reel means for an interval of time in a first direction to extend an end portion of said antenna wire into the air stream,
and means for selectively declutching said reel means from said biased driving means at the end of said interval of time in order to allow the action of the air stream upon the antenna wire end portion to fully extend said antenna wire outwardly from the aircraft.

References Cited

UNITED STATES PATENTS

| | | | |
|---|---|---|---|
| 2,048,015 | 7/1936 | Logue | 343—707 XR |
| 2,085,585 | 6/1937 | Hamilton | 343—707 |

ELI LIEBERMAN, Primary Examiner

M. NUSSBAUM, Assistant Examiner

U.S. Cl. X.R.

343—877